(12) United States Patent
Heinle et al.

(10) Patent No.: US 10,437,822 B2
(45) Date of Patent: Oct. 8, 2019

(54) GROUPING TABLES IN A DISTRIBUTED DATABASE

(71) Applicant: SAP SE, Walldorf (DE)

(72) Inventors: Antje Heinle, Muehlhausen (DE); Hans-Joerg Leu, Dossenheim (DE)

(73) Assignee: SAP SE, Walldorf (DE)

( * ) Notice: Subject to any disclaimer, the term of this patent is extended or adjusted under 35 U.S.C. 154(b) by 262 days.

(21) Appl. No.: 15/451,279

(22) Filed: Mar. 6, 2017

(65) Prior Publication Data
US 2018/0253475 A1    Sep. 6, 2018

(51) Int. Cl.
| | | |
|---|---|---|
| G06F 17/30 | (2006.01) | |
| G06F 16/2453 | (2019.01) | |
| G06F 16/27 | (2019.01) | |
| G06F 16/21 | (2019.01) | |
| G06F 16/2455 | (2019.01) | |

(52) U.S. Cl.
CPC ...... G06F 16/24544 (2019.01); G06F 16/211 (2019.01); G06F 16/24545 (2019.01); G06F 16/24554 (2019.01); G06F 16/27 (2019.01)

(58) Field of Classification Search
CPC .................................................. G06F 16/2272
See application file for complete search history.

(56) References Cited

U.S. PATENT DOCUMENTS

| | | | | |
|---|---|---|---|---|
| 2004/0193803 A1* | 9/2004 | Mogi | .................. | G06F 12/0871 711/129 |
| 2017/0017674 A1* | 1/2017 | Scheuer | .............. | G06F 16/2282 |

* cited by examiner

*Primary Examiner* — Hung Q Pham
(74) *Attorney, Agent, or Firm* — Mintz Levin Cohn Ferris Glovsky and Popeo, P.C.

(57) ABSTRACT

In one respect, there is provided a method. The method can include identifying, based on a plurality of queries executed at a distributed database, a disjoint table set. The identifying of the disjoint table set can include: identifying a first table used in executing a first query; identifying a second query also using the first table used in executing the first query; identifying a second table used in executing the second query but not in executing the first query; and including, in the disjoint table set, the first table and the second table. The method can further include allocating, based at least on the first disjoint table set, a storage and/or management of the first disjoint table set such that the first disjoint table set is stored at and/or managed by at least one node in the distributed database. Related systems and articles of manufacture are also disclosed.

19 Claims, 7 Drawing Sheets

GROUPING TABLES IN A DISTRIBUTED DATABASE

FIELD

The present disclosure generally relates to database processing and, more specifically, to the clustering of tables in a distributed database system.

BACKGROUND

Data in a distributed database system is stored across a multitude of physically and/or logically distinct nodes. For example, data in a distributed database system may be stored on different computers. Alternately or additionally, data in a distributed database system may be managed by separate processes. As such, executing a query (e.g., a structured query language (SQL) statement or the like) in a distributed database system may require multiple nodes to perform operations on the data stored at and/or managed by each individual node. Moreover, executing the query may further require a transfer of data (e.g., intermediate query results) between multiple nodes.

SUMMARY

Methods, systems, and articles of manufacture, including computer program products, are provided for clustering tables. In some implementations of the current subject matter, there is provided a system. The system can include at least one processor and at least one memory. The at least one memory can include program code that provides operations when executed by the at least one processor. The operations can include: identifying, based at least on a plurality of queries executed at a distributed database, a first disjoint table set; and allocating, based at least on the first disjoint table set, a storage and/or management of the first disjoint table set such that the first disjoint table set is stored at and/or managed by at least one node in the distributed database. The identifying of the first disjoint table set can include: identifying a first table that is used in executing a first query; identifying a second query that also uses the first table used in executing the first query; identifying a second table that is used in executing the second query but not in executing the first query; and including, in the first disjoint table set, the first table and the second table.

In some variations, one or more of the features disclosed herein including the following features can optionally be included in any feasible combination. A plurality of queries can be selected based at least on a recentness and/or frequency of use. The first table can include data required for executing the first query and the second query. The second table can include data required for executing the second query but not the first query. At least one key performance indicator (KPI) associated with the first disjoint table set can be determined.

In some variations, the at least one KPI can include a total, average, maximum, and/or minimum execution count corresponding to a number of times the first table and/or the second table are used in executing the first query and/or the second query.

In some variations, the at least one KPI can include a total, average, maximum, and/or minimum execution time corresponding to a length of time required to execute the first query and/or the second query.

In some variations, the first disjoint table set can be split into a first subset and a second subset, when the at least one KPI exceeds a threshold value. The storage and/or management of the first disjoint table set can be allocated such that the first subset is stored at and/or managed by a first node in the distributed database and the second subset is stored at and/or managed by a second node in the distributed database.

In some variations, the executing of the first query and the executing of the second query do not require data from tables included in a second disjoint table set while the executing of a third query requires data from at least one table in the second disjoint table set but not data from any table in the first disjoint table set.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Like labels are used to refer to same or similar items in the drawings.

DETAILED DESCRIPTION

The execution of a query (e.g., a SQL statement or the like) in a distributed database can require a transfer of data (e.g., intermediate query results) between multiple nodes in the distributed database, thereby increasing the network overhead (e.g., bandwidth) associated with the query. Accordingly, the storage and/or management of data are typically distributed across various nodes in a manner that minimizes the transfer of data between nodes. For instance, data that is required to respond to different queries may be stored in two or more tables such that these tables are generally be used (e.g., accessed) together when responding to various queries. These tables would typically be stored at and/or managed by the same node in an effort to maximize the locality of the data stored at the node. But while maximizing the locality of data can reduce the transfer of data between the nodes in a distributed database, it can also introduce a workload (e.g., central processing unit (CPU) load, query load, memory load, and/or the like) imbalance across the nodes in the distributed database. For example, maximizing data locality may concentrate the storage and/or management of tables to very few nodes in the distributed database. As such, a small number of nodes may be required execute a disproportionately high number of queries while other nodes in the distributed database remain largely idle.

In some implementations of the current subject matter, an allocation engine can be configured to identify one or more disjoint table sets. The allocation engine can identify the one or more disjoint table sets based on a selection of queries. For instance, the allocation engine can identify the one or more disjoint table set based on a number (e.g., 200,000) of the most recently and/or most frequently used queries (e.g., SQL statements or the like). Each disjoint table set may include one or more tables that are used either individually and/or in combination to respond to at least a portion of the query selection. According to some implementations of the current subject matter, the allocation engine can further determine, for each disjoint table set, one or more key performance indicators (KPIs) including, for example, an execution time and an execution count. The execution time for a disjoint table set may correspond to a length of time (e.g., total, average, minimum, maximum) required to execute various queries using one or more tables from that disjoint table set. Meanwhile, the execution count for a disjoint table set may correspond to a number of times (e.g., total, average, minimum, maximum) each table in the disjoint table set is used in executing various queries.

In some implementations of the current subject matter, the allocation engine can be further configured to split a table set (e.g., a disjoint table set) such that tables in the set are stored at and/or managed by multiple nodes in a distributed database instead of a single node. For instance, the allocation engine can split a table set when one or more KPIs (e.g., execution count, execution time) associated with that table set exceed a threshold value. According to some implementations of the current subject matter, the allocation engine can split a table set into two or more subsets such that the respective KPIs (e.g., execution count, execution time) of each subset are all below a threshold value and/or are substantially the same value. Alternately and/or additionally, the allocation engine can split a table set into two or more subsets such that at least one cross KPI between the two or more subsets is minimized. Minimizing a cross KPI (e.g., execution count, execution time) may include minimizing the KPI arising from queries that use tables from more than one subset. In doing so, the allocation engine can achieve a more balanced workload (e.g., CPU load, query load, memory load) across the nodes in the distributed database system while still minimizing the network overhead (e.g., bandwidth) engendered by a transfer of data between different nodes.

In some implementations of the current subject matter, the allocation engine can split a table set into two or more subsets by identifying tables from the table set that can be split off into a subset, and thus stored at a different node than tables still remaining in the table set. Moving a table from the table set into a subset may decrease one or more KPIs (e.g., execution count, execution time) associated with the table set but may also increase one or more cross KPIs. As such, the allocation engine may be configured to determine one or more KPIs and cross KPIs for the subset of one or more tables, whenever a table from the table set is added to the subset. The allocation engine may be configured to ensure that the one or more KPIs and cross KPIs are kept within threshold values. For example, when adding a table from the table set to the subset, the allocation engine may determine whether adding the table to the subset causes one or more cross KPIs for the subset to exceed a threshold value. That is, the allocation engine may determine whether storing the table at a separate node from other tables in the table set would engender an excessive amount of data transfer between the various nodes. Alternatively and/or additionally, the allocation engine may determine whether the addition of the table to the subset causes one or more KPIs for the subset to exceed a minimum and/or a maximum threshold value. Here, the allocation engine is configured to ensure that the storage and/or management of the tables are distributed across the nodes such that no node in the distributed database is subject to an excessively high or low workload (e.g., CPU load, query load, memory load).

Figure 1:
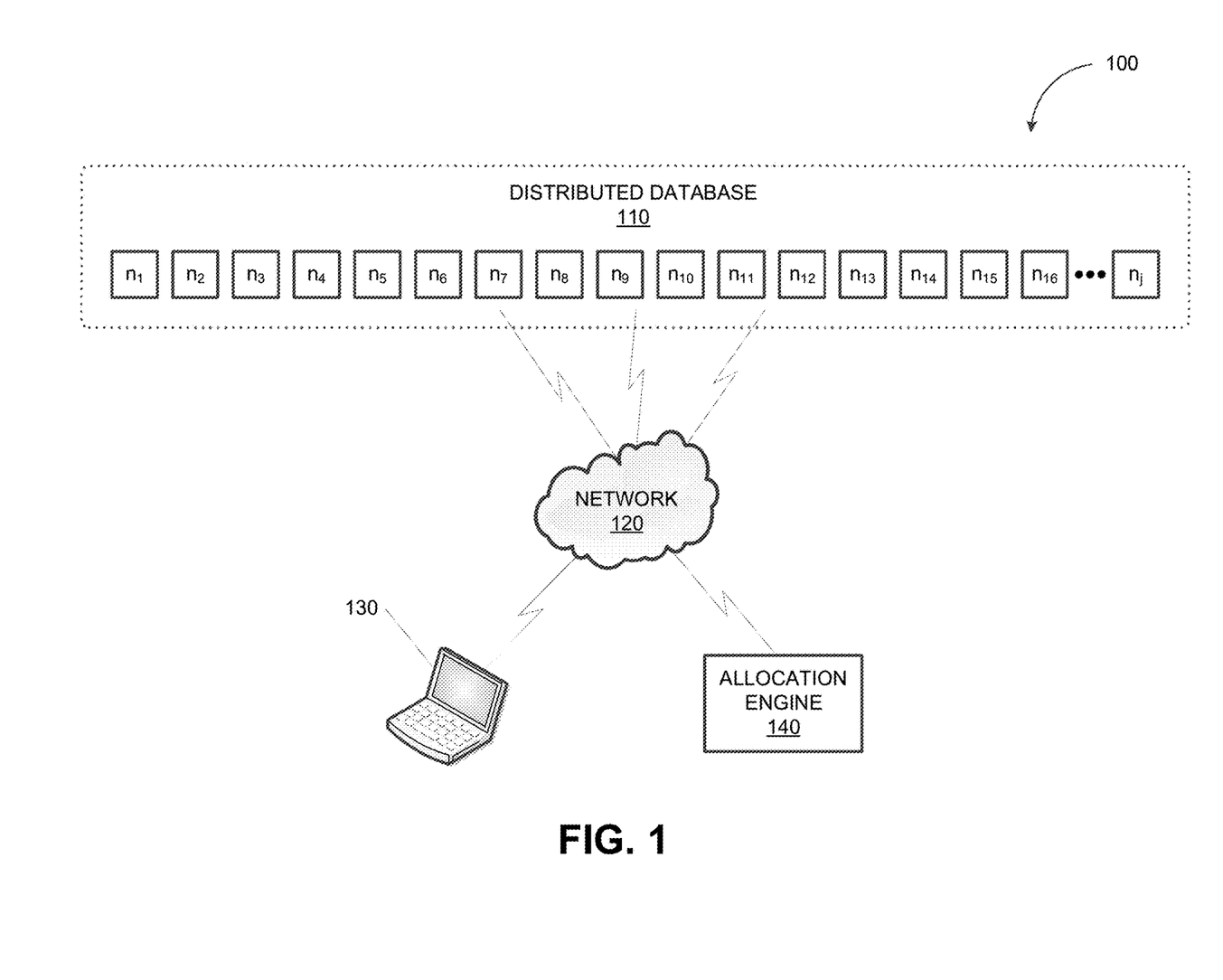
FIG. 1 depicts a network diagram illustrating a network environment consistent with implementations of the current subject matter.

FIG. 1 depicts a network diagram illustrating a network environment 100 consistent with implementations of the current subject matter. Referring to FIG. 1, a distributed database 110 can include a j number of nodes (e.g., $n_1$ through $n_j$). The nodes $n_1$ through $n_j$ can be communicatively coupled via a wired and/or wireless network 120. The wired and/or wireless network 120 can be a wide area network (WAN), a local area network (LAN), and/or the Internet. The distributed database system 100 can include any number of nodes without departing from the scope of the present disclosure.

In some implementations of the current subject matter, a client 130 can communicate with the distributed database 110 via the wired and/or wireless network 120. For instance, the client 130 can submit a query (e.g., a SQL statement or the like) to the distributed database 110. Data in the distributed database 110 can be stored and/or managed across different nodes (e.g., one or more of the nodes $n_1$ through $n_j$). For instance, one or more of the nodes $n_1$ through $n_j$ may each store at least one table. Meanwhile, executing the query from the client 130 may require data from multiple tables. As such, fulfilling the query from the client 130 can require the use of tables stored at and/or managed by one or more of the nodes $n_1$ through $n_j$. Thus, according to some implementations of the current subject matter, the storage and/or management of different tables can be allocated across the nodes $n_1$ through $n_j$ in a manner that balances the workload (e.g., CPU load, query load, memory load) across the nodes $n_1$ through $n_j$ and/or minimizes the amount of data transfer (e.g., network overhead) amongst the nodes $n_1$ through $n_1$.

Referring again to FIG. 1, an allocation engine 140 can be communicatively coupled with the distributed database 110. In some implementations of the current subject matter, the allocation engine 140 can be configured to identify one or more disjoint table sets that each include one or more tables that are used individually and/or in combination to respond to at least a portion of a selection of the most recently and/or frequently used queries at the distributed database 110. Furthermore, the allocation engine 140 can also determine, for each disjoint table set, one or more KPIs including, for example, an execution time and an execution count.

In some implementations of the current subject matter, the allocation engine 140 can be further configured to split a table set (e.g., a disjoint table set) into two or more subsets that are to be stored at and/or managed by different nodes in the distributed database 110. For example, the allocation engine 140 can split a table set when at least one KPI (e.g., execution time, execution count) associated with that table set exceed a threshold value. The allocation engine 140 can split the table set such that the respective KPIs (e.g., execution count, execution time) of each subset are all below a threshold value and/or are substantially the same value. Alternately and/or additionally, the allocation engine can split a table set into two or more subsets such that at least one cross KPI between the two or more subsets is minimized.

In some implementations of the current subject matter, the functionalities of the allocation engine 140 can be accessed as a remote (e.g., cloud or the like) service via the network 120. For instance, the allocation engine 140 can be deployed at a separate remote platform and/or at the client device 130 as computer software and/or dedicated circuitry (e.g., application specific integrated circuits (ASICs)). Alternately and/or additionally, the allocation engine 140 can also be deployed at the distributed database 110. For example, the allocation engine 140 can be implemented as computer software and/or dedicated circuitry (e.g., ASICs) at one or more of the nodes $n_1$ through $n_j$.

For clarity and conciseness, data in the distributed system 100 is described as having a columnar format (e.g., tables). However, it should be appreciated that data in the distributed system 100 can be organized to have a different and/or additional structural format without departing from the scope of the present disclosure.

Figure 2:
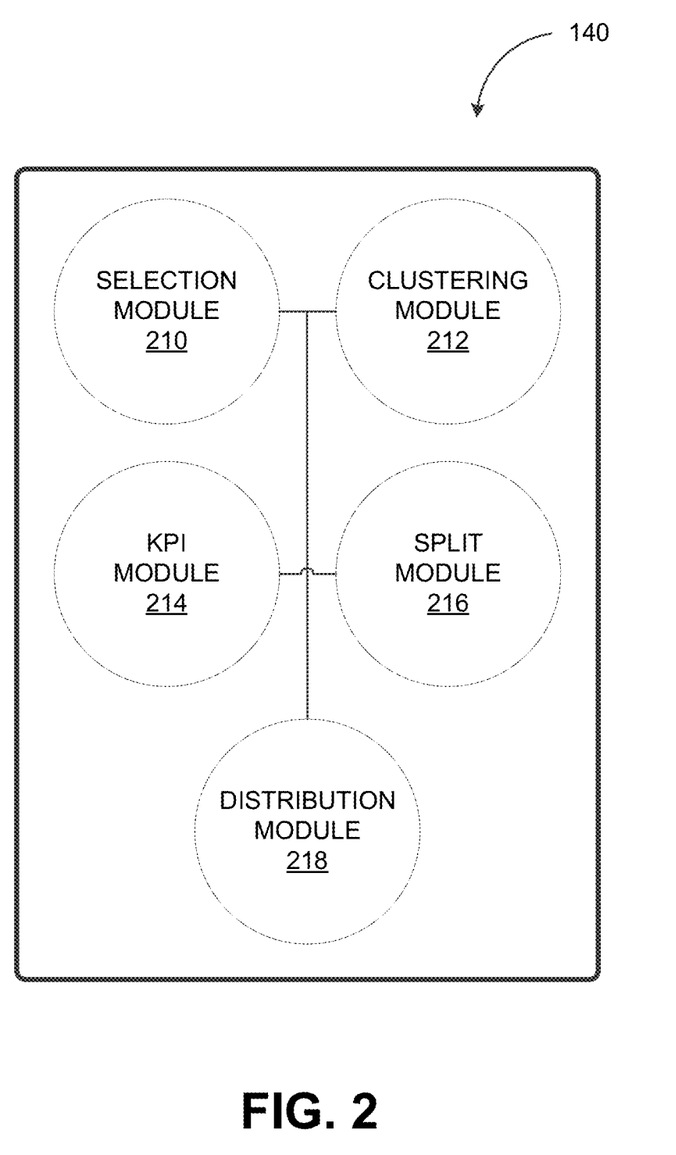
FIG. 2 depicts a block diagram illustrating an allocation engine consistent with implementations of the current subject matter.

FIG. 2 depicts a block diagram illustrating the allocation engine 140 consistent with implementations of the current subject matter. Referring to FIGS. 1-2, the allocation engine 140 can include a selection module 210, a clustering module 212, a KPI module 214, a split module 216, and a distribution module 218. It should be appreciated that the allocation engine 140 can include additional and/or different modules without departing from the scope of the present disclosure.

In some implementations of the current subject matter, the selection module 210 can be configured to generate a selection of queries based on the queries that are received at the distributed database 110. For example, the selection module 210 can be configured to generate a query selection that includes a number (e.g., 200,000) of the most recently used queries at the distributed database 110. Alternately and/or additionally, the selection module 210 can be configured to generate a query selection that includes a number (e.g., 200,000) of the most frequently used queries at the distributed database 110. It should be appreciated that the selection module 210 can generate the query selection based on different and/or additional criteria without departing from the scope of the present disclosure.

In some implementations of the current subject matter, the clustering module 212 can be configured to identify one or more disjoint table sets. For example, the clustering module 212 can identify the disjoint table sets based on the query selection (e.g., most recently and/or frequently used queries) generated by the selection module 210. Each of the one or more disjoint table sets can include tables that are used either individually and/or in combination to respond to at least a portion of the query selection (e.g., generated by the selection module 210).

In some implementations of the current subject matter, the KPI module 214 can be configured to determine one or more KPIs for each disjoint table set identified by the clustering module 212. For instance, the KPI module 214 can determine an execution count for each disjoint table set identified by the clustering module 212. The execution count for a table set may correspond to a total, average, maximum, and/or minimum number of times each table in the table set is used by the queries associated with that table set. Alternately and/or additionally, the KPI module 214 can determine an execution time for each disjoint table set identified by the clustering module 212. The execution time for a table set may correspond to a total, average, maximum, and/or minimum amount of time required for executing the queries associated with that table set.

In some implementations of the current subject matter, the split module 216 can be configured to split a table set into two or more subsets. The split module 216 can be configured to split a table set in a manner that balances the workload (e.g., CPU load, query load, memory load) across the nodes $n_1$ through $n_j$. Alternately and/or additionally, the split module 216 can split the table set in a manner that minimizes the amount of data transfer (e.g., network overhead) amongst the nodes $n_1$ through $n_j$.

For instance, the split module 216 can split, into two or more subsets, at least one disjoint table set identified by the clustering module 212. According to some implementations of the current subject matter, the split module 216 can split a table set when at least one KPI (e.g., execution count, execution time) associated with the table set (e.g., as determined by the KPI module 214) exceeds a threshold value. The split module 216 can split a table set into two or more subsets such that the respective KPIs (e.g., execution count, execution time) of each subset are all below a threshold value and/or are substantially the same value. Alternately and/or additionally, the allocation engine can split a table set into two or more subsets such that at least one cross KPI between the two or more subsets is minimized.

In some implementations of the current subject matter, the distribution module 218 can be configured to distribute tables (e.g., of data) for storage at and/or management by one or more of the nodes $n_1$ through $n_j$. The distribution module 218 can be configured to distribute the tables based at least on the splits determined by the split module 216. For example, the distribution module 218 may allocate, based at least on a split determined by the split module 216, the storage and/or management of a disjoint table set to two or more of the $n_1$ through $n_j$ in the distributed database 110. As such, one subset from the disjoint table set may be stored at and/or managed by one node while another subset from the disjoint table set may be stored at and/or managed by a different node. Distributing the storage and/or management of tables in this manner may balance the workload (e.g., CPU load, query load, memory load) across the nodes $n_1$ through $n_n$ and/or minimize the amount of data transfer (e.g., network overhead) amongst the nodes $n_1$ through $n_j$.

Figure 3A:
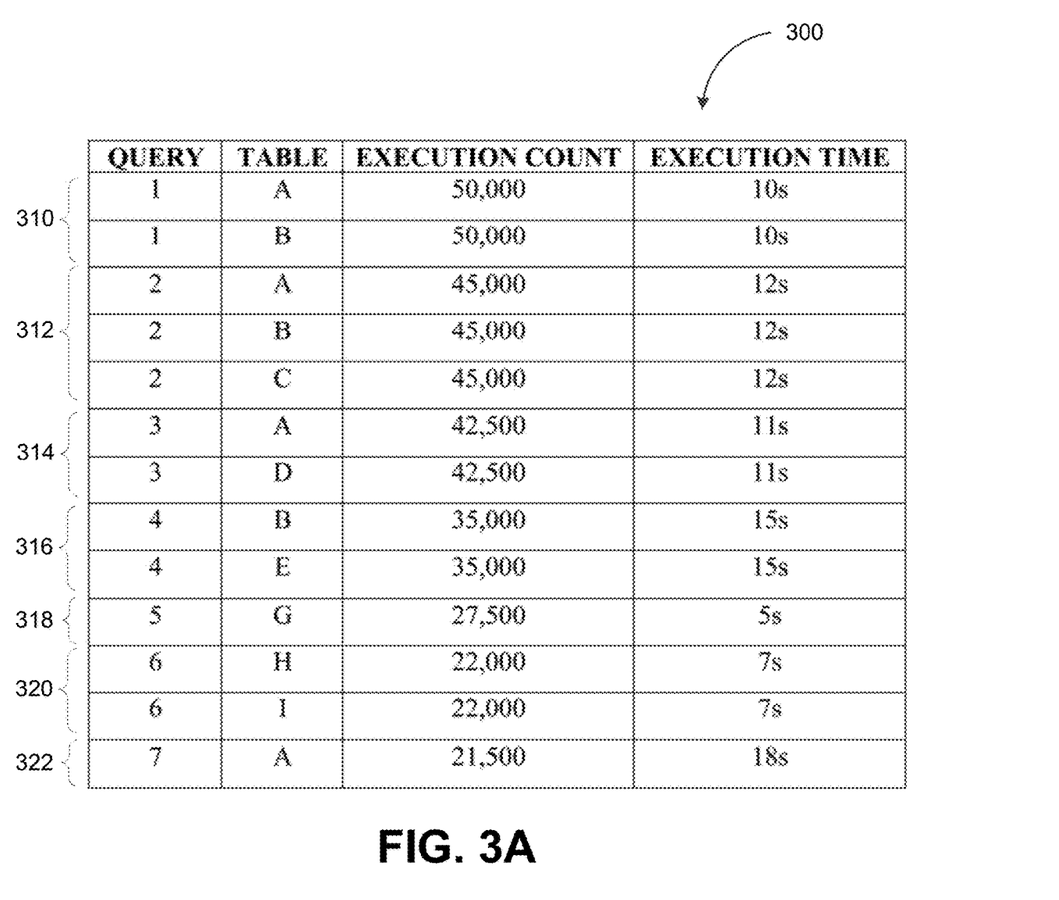
FIG. 3A depicts a table illustrating a plurality of query table pairs consistent with implementations of the current subject matter.

FIG. 3A depicts a table 300 illustrating a plurality of query table pairs consistent with implementations of the current subject matter. Referring to FIG. 1-3, the plurality of query table pairs shown in the table 300 can correspond to a selection of queries (e.g., most recently used and/or frequently used queries) generated by the selection module 210. For instance, the table 300 can include a number of the most recently and/or frequently used queries (e.g., SQL statements or the like) at the distributed database 110. As shown in FIG. 3A, the table 300 can include a selection of queries that includes, for example, a first query 310, a second query 312, a third query 314, a fourth query 316, a fifth query 318, a sixth query 320, and a seventh query 322.

In some implementations of the current subject matter, each query can be associated with an identifier (e.g., a unique integer number). For instance, the first query 310 can be associated with an identifier (e.g., the number "1") while the second query 312 can be associated with a different identifier (e.g., the number "2"). Furthermore, each query can be associated with one or more tables that include data required for executing the query. For example, the first query 310 may be a JOIN operation that combines data from Table A and Table B. Thus, executing the first query 310 can require data from Table A and Table B. Meanwhile, executing the second query 320 can require data from Table A, Table B, and Table C.

Referring again to FIG. 3A, each query in the table 300 can further be associated with one or more KPIs. For instance, the first query 310 can be associated with an execution count (e.g., 50,000) corresponding to a number of times Table A is used in executing the first query 310 and a separate execution count (e.g., 50,000) corresponding to a number of times Table B is used in executing the first query 310. Alternately and/or additionally, the first query 310 can be associated with an execution time (e.g., 10 seconds) corresponding to a length of time required to execute the first query 310. Similarly, the second query 312 can also be associated with execution counts corresponding to a respective number of times Table A, Table B, and Table C are used in executing the second query 312. The second query 312 can further be associated with an execution time corresponding to a length of time required to execute the second query 312.

In some implementations of the current subject matter, execution count may be a measure of a number of times a table (e.g., Table A, Table B, Table C) is used in executing queries since the last system restart (e.g., of the distributed database 110). When two or more tables are used in executing the same query, the respective execution counts of the tables can be incremented by a same amount. Meanwhile, execution time may be a measure of a length of time required to execute queries since the last restart of the system (e.g., of the distributed database 110). In some implementations of the current subject matter, the execution time of a query may provide an indication of the complexity of the query. Because the execution time for executing the same query may vary, the execution time associated with a query may be an average execution time for executing that query.

The clustering module 212 can identify one or more disjoint table sets based at least on the table 300. According to some implementations of the current subject matter, the query table pairs included in the table 300 can be sorted prior to being used by the clustering module 212 to identify one or more disjoint table sets. For example, the query table pairs included in the table 300 can be sorted based on one or more KPIs. As shown in FIG. 3A, the query table pairs included in the table 300 are sorted based on the respective execution counts associated with each query. Alternately and/or additionally, the query table pairs included in the table 300 can be sorted based on the respective execution times for each query.

Figure 4A:
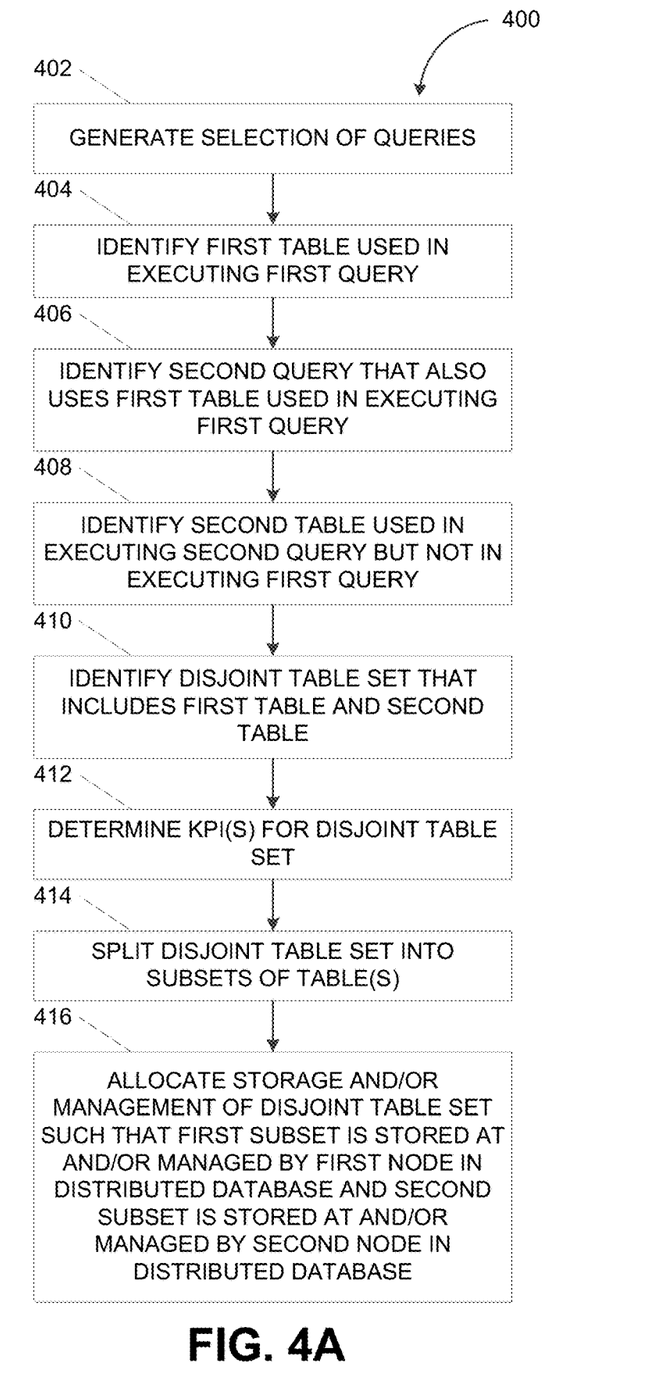
FIG. 4A depicts a flowchart illustrating a process for identifying a disjoint table set consistent with implementations of the current subject matter.

FIG. 4A depicts a flowchart illustrating a process 400 for identifying a disjoint table set consistent with implementations of the current subject matter. Referring to FIGS. 1-4, the process 400 can be performed by the allocation engine 140.

The allocation engine 140 can generate a selection of queries (402). For example, the allocation engine 140 (e.g., the selection module 210) can generate a query selection having a number (e.g., 200,000) of the most recently and/or frequently used queries (e.g., SQL statements or the like) at the distributed database 110. In some implementations of the current subject matter, the query selection can be sorted based on one or more KPIs associated with each query. For instance, the queries in the query selection can be sorted based on the execution count and/or execution time associated with each query.

The allocation engine 140 can identify a first table that is used in executing a first query (404). For example, the allocation engine 140 (e.g., the clustering module 212) can identify Table A and Table B as being used by the first query 310. That is, Table A and Table B can both include data that is used in executing the first query 310.

The allocation engine 140 can identify a second query that also uses the first table used in executing the first query (406). For example, the second query 312, the third query 314, the fourth query 316, and the seventh query 322 all require data from Table A and/or Table B. As such, the allocation engine 140 (e.g., the clustering module 212) can identify the second query 312, the third query 314, the fourth query 316, and the seventh query 322 as also using Table A and/or Table B.

The allocation engine 140 can identify a second table that is used in executing the second query but not in executing the first query (408). For instance, executing the second query 312 can require data from Table A and Table B, which are also used by the first query 310. However, executing the second query 312 can also require data from Table C, which is not used by the first query 310. Thus, the allocation engine 140 (e.g., the clustering module 212) can identify Table C as table that is used by the second query 312 but not the first query 310. Meanwhile, executing the third query 314 can require data from Table A and Table D while executing the fourth query 316 can require data from Table B and Table E. As such, the allocation engine 140 (e.g., the clustering module 212) can further identify Table D as being used by the third query 314 but not the first query 310. Similarly, the allocation engine 140 (e.g., the clustering module 212) can identify Table E as being used by the fourth query 316 but not the first query 310.

The allocation engine 140 can identify a disjoint table set that includes the first table and the second table (410). For example, the allocation engine 140 can identify one disjoint table set that includes Table A, Table B, Table C, Table D, and Table E. This disjoint table set includes tables that are used individually and/or in combination in executing at least a portion of the query selection shown in table 300.

In some implementations of the current subject matter, operations 404 through 410 can be repeated for any remaining queries in the selection of queries generated at operation 402. For example, the allocation engine 140 (e.g., the clustering module 212) can identify Table G as being used by the fifth query 318. As Table G is not used by any other queries in the query selection, the allocation engine 140 can identify another disjoint table set that includes Table G. Similarly, the allocation engine 140 can identify Table H and Table I as being used by the sixth query 320. The allocation engine 140 can identify a disjoint table set that includes Table H and Table I because neither Table H nor Table I are used by any other queries in the query selection.

Figure 3B:
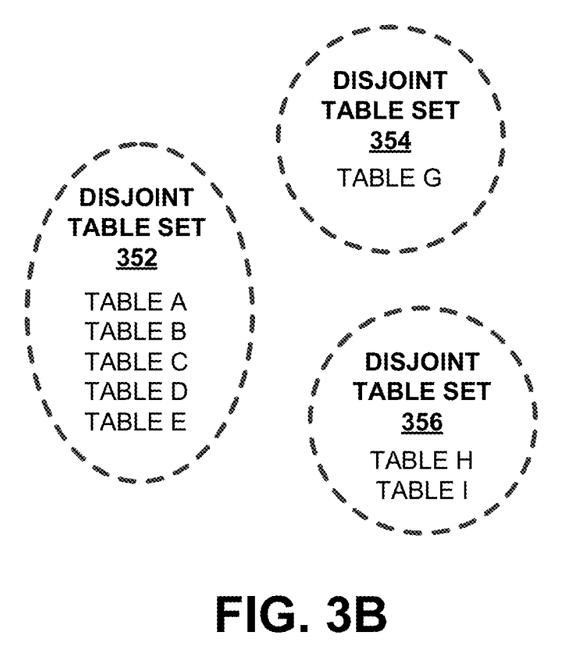
FIG. 3B depicts a plurality of disjoint table sets consistent with implementations of the current subject matter.

FIG. 3B depicts a plurality of disjoint table sets consistent with implementations of the current subject matter. Referring to FIGS. 3A-B, the allocation engine 140 can identify, based at least on the Table 300, a plurality of disjoint table sets that includes, for example, a first disjoint table set 352, a second disjoint table set 354, and a third disjoint table set 356. A disjoint table set is disjoint from other disjoint table sets because the disjoint table set includes all the tables that are required for executing the queries associated that disjoint table set. Thus, all the queries associated with one disjoint table set can be executed without requiring data from tables included in any other disjoint table set.

As shown in FIG. 3B, the first disjoint table set 352 can include Table A, Table B, Table C, Table D, and Table E. One or more of Table A, Table B, Table C, Table D, and Table E are used by the first query 310, the second query 312, the third query 314, the fourth query 316, and the seventh query 322. All the data required for executing the first query 310, the second query 312, the third query 314, the fourth query 316, and the seventh query 322 are in the tables included in the first disjoint table set 352. Thus, executing the first query 310, the second query 312, the third query 314, the fourth query 316, and the seventh query 322 would not require data in tables included in the second disjoint table set 354 or the third disjoint table set 356. Other queries in the query selection (e.g., the fifth query 318 and the sixth query 320) also would not require data from the tables in the first disjoint table set 352. Meanwhile, the second disjoint table set 354 includes Table G, which is used only by the fifth query 318 and not by any of the other queries in the query selection. Similarly, the third disjoint table 356 includes Table H and Table I, which are used only by the sixth query 320.

The allocation engine 140 can determine at least one KPI for the disjoint table set (412). For example, the allocation engine 140 (e.g., the KPI module 214) can determine a total, average, maximum, and/or minimum execution count for the queries associated with the first disjoint table set 352, the second disjoint table set 354, and/or the third disjoint table set 356. Alternately and/or additionally, the allocation engine 140 can determine a total, average, maximum, and/or minimum execution time for the queries associated with the first disjoint table set 352, the second disjoint table set 354, and/or the third disjoint table set 356.

The allocation engine 140 can split the disjoint table set into a first subset and a second subset of one or more tables (414). For instance, the allocation engine 140 (e.g., the split module 216) can split the first disjoint table set 352, when at least one KPI (e.g., execution count, execution time, and/or the like) associated with the first disjoint table set 352 exceeds a threshold value. The allocation engine 140 can split the first disjoint table 352 such that the first subset of one or more tables is to be stored at and/or managed by one node in the distributed database 110 while the second subset of one or more tables is to be stored at and/or managed by a different node in the distributed database system 110. According to some implementations of the current subject matter, the allocation engine 140 can split the first disjoint table set 352 in a manner that balances the workload (e.g., CPU load, query load, memory load) across the nodes $n_1$ through $n_j$ in the distributed database 110. Alternately and/or additionally, the allocation engine 140 can split the first disjoint table set 352 in a manner that minimizes the amount of data transfer (e.g., network overhead) amongst the nodes $n_1$ through $n_j$ in the distributed database 110.

The allocation engine 140 can allocate the storage and/or management of the disjoint table set such that the first subset of one or more tables is stored at and/or managed by a first node in a distributed database system and the second subset of one or more tables is stored at and/or managed by a second node in the distributed database system (416). For example, the allocation engine 140 can allocate the first subset of one or more tables such that the first subset of one or more tables is stored at and/or managed by one of the nodes (e.g., $n_1$ through $n_j$) in the distributed database 110. The allocation engine 140 can further allocate the second subset of one or more tables such that the second subset of one or more tables is stored at and/or managed by a different one of the nodes (e.g., $n_1$ through $n_j$) in the distributed database 110.

Figure 4B:
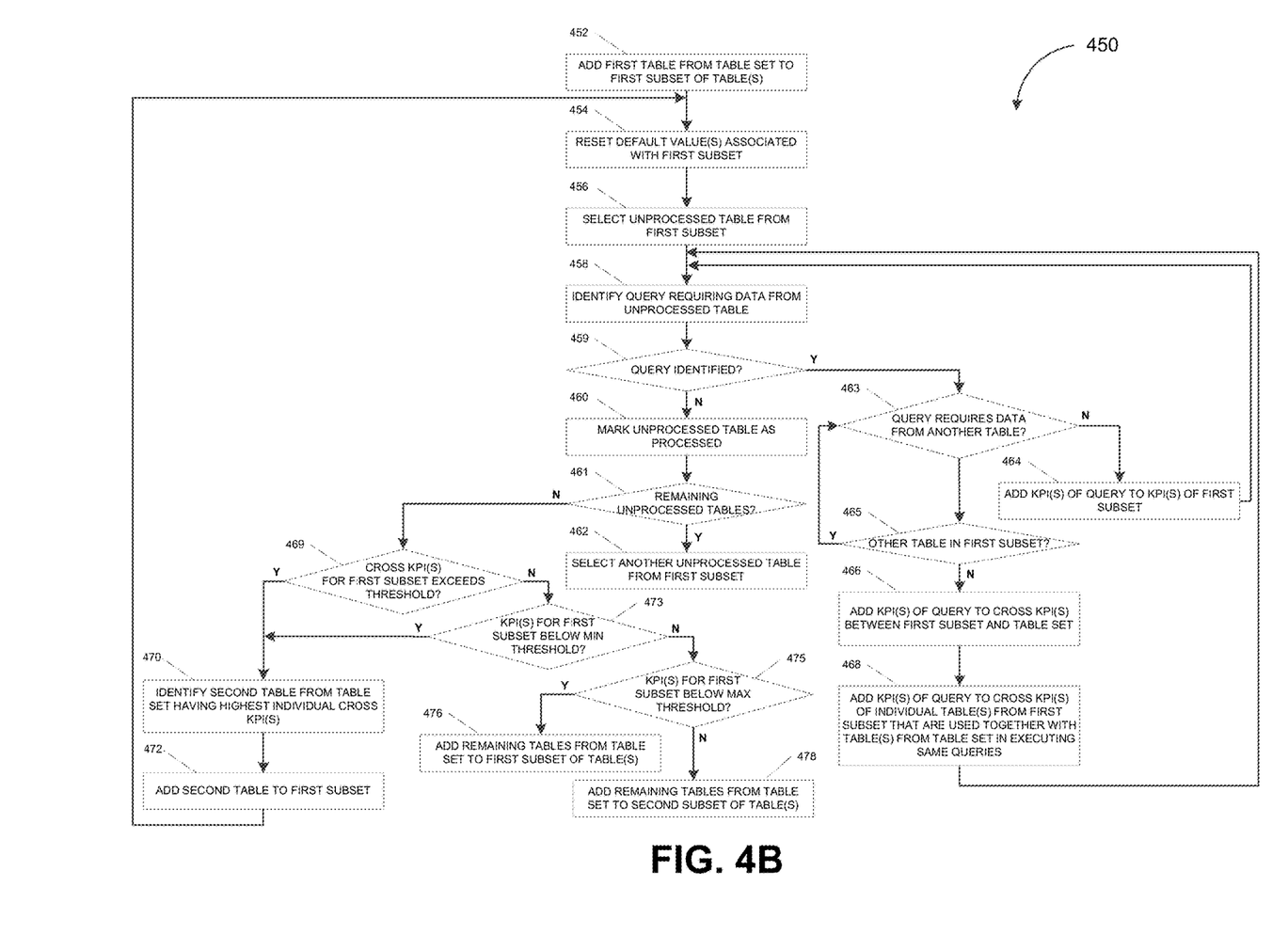
FIG. 4B depicts a flowchart illustrating a process for splitting a table set consistent with implementations of the current subject matter.

FIG. 4B depicts a flowchart illustrating a process 450 for splitting a table set consistent with implementations of the current subject matter. Referring to FIGS. 1-4B, the process 450 can be performed by the allocation engine 140 and can implement operation 414 of the process 400. It should be appreciated that the process 450 is performed to split a table set, when the table set is determined to have more than one table.

The allocation engine 140 can add a first table from a table set to a first subset of one or more tables (452). In some implementations of the current subject matter, the allocation engine 140 (e.g., the split module 216) can determine to split a disjoint table set (e.g., identified by the clustering module 212), when one or more of the disjoint table set's KPIs (e.g., execution count) exceed a threshold value. For instance, the allocation engine 140 can determine to split a disjoint table set when the KPI of the disjoint table set exceeds a certain percentage (e.g., 40%) of the overall KPI for a selection of the most recently and/or frequently used queries at the distributed database 110 (e.g., generated by the selection module 210). The allocation engine 140 can split the disjoint table set by identifying, in the disjoint table set, one or more tables to place in a subset of the disjoint table set.

As one example, the allocation engine 140 can select Table A from the first disjoint table set 352. The allocation engine 140 can further add Table A to a first subset of the first disjoint table set 352. According to some implementations of the current subject matter, the allocation engine 140 can be configured to select, from the table set, a table having a highest KPI such as, for example, execution count. Thus, the allocation engine 140 can add Table A to the first subset, when the allocation engine 140 determines that Table A has the highest execution count relative to other tables (e.g., Tables B, C, D, and E) in the first disjoint table set 352.

In some implementations of the current subject matter, splitting Table A from the first disjoint table set 352 to form the first subset may decrease one or more KPI (e.g., execution count) associated with the first disjoint table set 352. That is, removing Table A from the first disjoint table set 352 can decrease the workload (e.g., CPU load, query load, memory load) at the node storing and/or managing the remaining tables in the first disjoint table set 352. However, splitting Table A from the first disjoint table set 352 to form the first subset can also increase one or more cross KPIs indicative of an increase in an amount of data transfer between the node storing and/or managing the first subset and the node storing and/or managing the remaining tables in the first disjoint table set 352. Thus, according to implementations of the current subject matter, the allocation engine 140 is configured to split the first disjoint table set 352 into two or more subsets in a manner that balances the workload at the nodes storing and/or managing each subset while minimizing the amount of data transfer between these nodes.

The allocation engine 140 can reset one or more default values associated with the first subset (454). In some implementations of the current subject matter, the allocation engine 140 (e.g., the split module 216) can mark the first table as unprocessed. The allocation engine 140 can further set one or more KPIs to a null or zero value. For instance, the allocation engine 140 can set an execution count for the first subset to a null or zero value. The execution count for the first subset can correspond to a number of times tables in the first subset are used in executing one or more queries that only require data from tables in the first subset. Alternately and/or additionally, the allocation engine 140 can further set, to a null or zero value, a cross execution count between the first subset and the remaining tables in the table set. This cross execution count can correspond to a number of times the tables in the first subset and the remaining tables in the table set are used in executing one or more queries. In order to avoid an overlap in execution count and cross execution count, it should be appreciated that the execution count for the first subset specifically excludes execution count arising from queries that require data from both the tables in the first subset and the remaining tables in the table set.

The allocation engine 140 can select an unprocessed table from the first subset (456) and identify a query that requires data from the unprocessed table (458). For instance, the allocation engine 140 (e.g., the split module 216) can select Table A from the first subset of one or more tables and identify a query that requires data from Table A. If the allocation engine 140 is not able to successfully identify a query that requires data from the unprocessed table (459-N), the allocation engine 140 can mark the unprocessed table as processed (460). For example, if the allocation engine 140 cannot identify a query that requires data from Table A, then the allocation engine 140 can mark Table A as processed and continue processing the remaining tables in the first subset. According to some implementations of the current subject matter, the allocation engine 140 can determine whether there are any remaining unprocessed tables in the first subset (461). If the allocation engine 140 determines that there are remaining unprocessed tables in the first subset (461-Y), the allocation engine 140 can select another unprocessed table from the first subset (462) and the process 450 can continue at operation 458.

If the allocation engine 140 is able to successfully identify a query that requires data from the unprocessed table (459-Y), the allocation engine 140 can determine whether the query requires data from another table (463). For example, the allocation engine 140 (e.g., the split module 216) may determine that the first query 310 requires data from Table A. As such, the allocation engine 140 can determine whether the first query 310 requires data from any other tables. In doing so, the allocation engine 140 can identify other tables with data required by the first query 310 (e.g., Table B).

In some implementations of the current subject matter, the allocation engine 140 may determine that the query does not require data from another table (463-N). For instance, the seventh query 322 requires only data from Table A. In this scenario, the allocation engine 140 can add one or more KPIs associated with the query to corresponding KPIs of the first subset (464) and the process 450 can continue at 458. For example, the KPI (e.g., execution count) associated with seventh query 322 may be added to the KPI (e.g., execution count) of the first subset. The process 450 can continue at operation 458 where the allocation engine 140 can identify another query (e.g., the second query 312, the third query 314) that requires data from the unprocessed table.

Alternately and/or additionally, if the allocation engine 140 determines that the query requires data from another table (463-Y), the allocation engine 140 can further determine whether the other table is in the first subset (465). In some implementations of the current subject matter, the tables having data required by the first query 310 may be in the first subgroup or in the table set. Thus, to properly increment the KPIs (e.g., execution count) associated with the first subgroup and the cross KPI (e.g., execution count) between the first subgroup and the remaining tables in the table set, the allocation engine 140 (e.g., the split module 216) can determine which tables are in the first subgroup and which tables are still in the table set. For example, the allocation engine 140 can determine that in addition to Table A, the first query 310 also requires data from Table B. As such, the allocation engine 140 can determine whether Table B is in the first subgroup or still in the table set (e.g., the first disjoint table set 352).

If the allocation engine 140 determines that the other table is in the first subset (465-Y), the process 450 can continue at operation 463. For instance, if the allocation engine 140 (e.g., the split module 216) determines that Table B is already in the first subset, the allocation engine 140 can determine whether the first query 310 requires data from additional tables.

By contrast, if the allocation engine 140 determines that the other table is not in the first subset (465-N), the allocation engine 140 can add one or more KPIs associated with the query to the corresponding cross KPIs of the first subset (466). The allocation engine 140 can further add one or more KPIs associated with the query to the corresponding cross KPIs associated with individual tables from the first subset that are used together with tables from the table set in executing the same queries (468).

As noted above, the KPIs (e.g., execution count) of a query can be added to either the corresponding KPIs of a subset or the corresponding cross KPIs of the subset. The cross KPIs of the first subset may correspond to a number of times tables from both the first subset and remaining tables in the table set are used in executing one or more of the same queries. Thus, if the allocation engine 140 (e.g., the split module 216) determines that Table B is not already in the first subset, the KPIs (e.g., execution count) associated with the first query 310 may be added to the cross KPIs of the first subset instead of being added to the KPIs of the first subset. This increase to the cross KPI of the first subset reflects an increase in an amount of data transfer between the first subset and other tables in the table set, which is necessitated by having two or more tables required in executing the same query stored at and/or managed by different nodes in the distributed database 110. However, the KPIs of the first subset and the table set are not incremented in this scenario because the executing the query generally engenders the same workload increase at each of the nodes storing and/or managing the first subset and the table set In some implementations of the current subject matter, the allocation engine 140 may further keep track of the individual cross KPIs associated with Table B. This individual cross KPI may account for a number of times Table B is used together with another table in the first subset in executing one or more queries. For instance, the individual cross execution count of Table B may be incremented with the execution count associated with the first query 310 if Table A is part of the first subset and Table B is still a part the first disjoint group 352. The individual cross execution count for Table B would not incremented with the execution count of the first query 310 if both Table A and Table B are included in the first subset. Tracking the individual cross KPIs of a table may enable the allocation engine 140 to identify which tables split across different subsets of tables should be recombined into the same subgroup to reduce cross KPIs between subsets of tables (e.g., corresponding to the amount of data transfer between nodes storing and/or managing the different subsets of tables). Once the allocation engine 140 increments the cross KPIs of the first subset and the individual cross KPIs of the tables, the process 450 can continue at operation 458 where the allocation engine 140 attempts to identify another query that requires data from Table A.

When the allocation engine 140 determines that there are no remaining unprocessed tables in the first subset (461-N), the allocation engine 140 can determine whether one or more cross KPIs for the first subset exceed a threshold value (469). For example, the allocation engine 140 can determine whether one or more cross KPIs for the first subset exceeds a certain percentage (e.g., 20%) of the overall KPI for all queries executed using the first subset.

If the allocation engine 140 determines that one or more cross KPIs for the first subset exceeds a threshold value (469-Y), the allocation engine 140 can identify a second table from the table set having a highest individual cross KPI (470). The allocation engine 140 can further add the second table to the first subset (472) and the process 450 can continue at operation 454. For example, when the allocation engine 140 (e.g., the split module 216) determines that the cross KPI for the first subset exceeds a certain percentage (e.g., 20%) of the overall KPI for all queries (e.g., executed using the first subset), the allocation engine 140 can identify another table (e.g., Table B) from the first disjoint table set 352. The allocation engine 140 can identify Table B based on its individual cross KPI, which is updated (e.g., in operation 468) whenever Table B is used together with a table in a different subset (e.g., Table A). It should be appreciated that moving a table with the highest individual cross KPI (e.g., Table B) to the first subset may not necessarily decrease the cross KPI for the first subset such that the cross KPI for the first subset is below the threshold value (e.g., 20% of overall KPI). For instance, moving Table B to the first subset may increase the cross KPI for the first subset, if Table B is used with one or more tables (e.g., Table C, Table E) that are still in the first disjoint table set 352. Furthermore, moving another table into the first subset also increases the KPI of the first subset. Thus, the allocation engine 140 may be configured to recalculate the KPIs and the cross KPIs for the first subset by continuing the process 450 at operation 454.

Alternately and/or additionally, if the allocation engine 140 determines that one or more cross KPIs for the first subset does not exceed a threshold value (469-N), the allocation engine 140 can determine whether one or more KPIs for the first subset is below a minimum threshold value (473). If the allocation engine 140 determines that one or more KPIs for the first subset is below a minimum threshold value (473-Y), the allocation engine 140 can identify a second table from the table set having one or more highest individual cross KPIs (470) and add the second table to the first subset (472). In some implementations of the current subject matter, the allocation engine 140 may be configured to split the first disjoint table set 352 such that the workload (e.g., CPU load, query load, memory load) at each node storing and/or managing one or more tables is between a minimum threshold value (e.g., 15% of the overall KPI for all queries executed using the first subset) and a maximum threshold value (e.g., 65% of the overall KPI for all queries executed using the first subset). Maintaining the workload distribution in this manner ensures that no node is subject to too high or too low of a workload (e.g., CPU load, query load, memory load). Thus, if the allocation engine 140 determines that one or more KPIs for the first subset are below a minimum threshold value, the allocation engine 140 may add additional tables (e.g., Table C) to the first subset such that the node storing and/or managing the first subset is not overly idle. The process 450 can then continue at operation 454 as the allocation engine 140 recalculates the KPIs and the cross KPIs for the first subset.

If the allocation engine determines that one or more KPIs for the first subset are not below a minimum threshold value (473-N), the allocation engine 140 can determine if one or more KPIs for the first subset are below a maximum threshold value (475). For example, the allocation engine 140 may determine that one or more KPIs for the first subset exceed the minimum threshold value (e.g., 15% of the overall KPI for all queries executed using the first subset). In this scenario, the allocation engine 140 can determine that the node storing and/or managing the first subset is not subject to an excessively low workload. However, the node storing and/or managing the first subset may still be subject to an excessively high workload. As such, the allocation engine 140 may compare one or more KPIs for the first subset relative to a maximum threshold value, which may be a percentage (e.g., 65%) of the overall KPI for all queries executed using the first subset.

The allocation engine 140 may determine that one or more KPIs for the first subset are below the maximum threshold value (475-Y). In this scenario, the node storing and/or managing the first subset is still able to accommodate additional tables. As such, the allocation engine 140 may add any remaining tables from the table set to the first subset of one or more tables (476). For instance, the allocation engine 140 (e.g., the split module 216) may add Table C, Table D, and/or Table E from the first disjoint table set 352 to the first subset. Alternately and/or additionally, the allocation engine 140 may determine that one or more KPIs for the first subset are not below the maximum threshold value (475-N). In this scenario, the node storing and/or managing the first subset may already be subject to high workload (e.g., CPU load, query load, memory load). Thus, the allocation engine 140 may add any remaining tables from the table set to a second subset of one or more tables (476). For instance, instead of the first subset, the allocation engine 140 may add Table C, Table D, and/or Table E to another subset of one or more tables because the node storing and/or managing the first subset is already being subject to a large workload and cannot accommodate additional tables.

Figure 5:
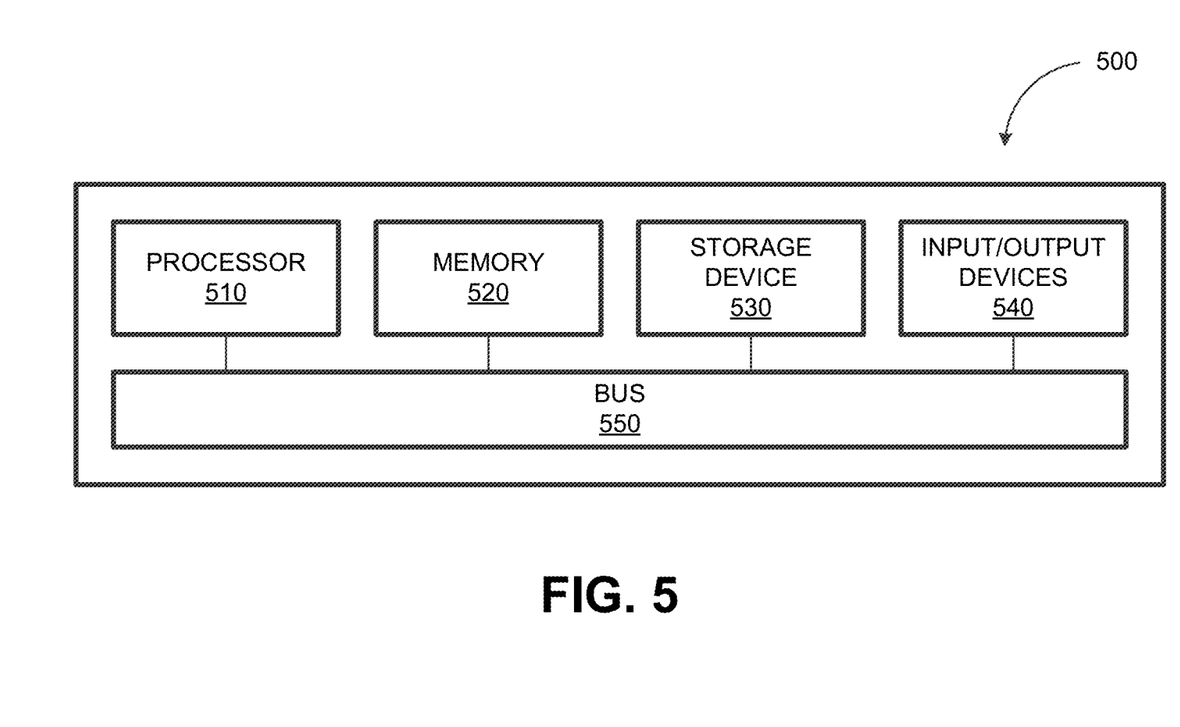
FIG. 5 depicts a block diagram illustrating a computing system consistent with implementations of the current subject matter.

FIG. 5 depicts a block diagram illustrating a computing system 500 consistent with implementations of the current subject matter. Referring to FIGS. 1 and 5, the computing system 500 can be used to implement the allocation engine 140 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the allocation engine 140. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer implemented method, comprising:
   identifying, based at least on a plurality of queries executed at a distributed database, a first disjoint table set, the first disjoint table set including a first plurality of tables that are used either individually and/or in combination in executing the plurality of queries, and the identifying of the first disjoint table set comprising:

identifying a first table that is used in executing a first query;
identifying a second query that also uses the first table used in executing the first query;
identifying a second table that is used in executing the second query but not in executing the first query; and
including, in the first disjoint table set, the first table and the second table; and
allocating a storage and/or management of the first disjoint table set including by storing the first disjoint table set at a different node in the distributed database than a second disjoint table set including a second plurality of tables that are not used in executing any of the plurality of queries.

2. The computer-implemented method of claim 1, further comprising:
selecting, based at least on a recentness and/or a frequency of use, the plurality of queries.

3. The computer-implemented method of claim 1, wherein the first table includes data required for executing the first query and the second query.

4. The computer-implemented method of claim 1, wherein the second table includes data required for executing the second query but not the first query.

5. The computer-implemented method of claim 1, further comprising:
determining at least one key performance index (KPI) associated with the first disjoint table set.

6. The computer-implemented method of claim 5, wherein the at least one KPI comprises a total, average, maximum, and/or minimum execution count corresponding to a number of times the first table and/or the second table are used in executing the first query and/or the second query.

7. The computer-implemented method of claim 5, wherein the at least one KPI comprises a total, average, maximum, and/or minimum execution time corresponding to a length of time required to execute the first query and/or the second query.

8. The computer-implemented method of claim 5, further comprising:
splitting the first disjoint table set into a first subset and a second subset in response to the at least one KPI exceeding a threshold value.

9. The computer-implemented method of claim 8, further comprising:
allocating the storage and/or management of the first disjoint table set such that the first subset is stored at and/or managed by a first node in the distributed database and the second subset is stored at and/or managed by a second node in the distributed database.

10. A system, comprising:
at least one data processor; and
at least one memory storing instructions which, when executed by the at least one data processor, result in operations comprising:
identifying, based at least on a plurality of queries executed at a distributed database, a first disjoint table set, the first disjoint table set including a first plurality of tables that are used either individually and/or in combination in executing the plurality of queries, and the identifying of the first disjoint table set comprising:
identifying a first table that is used in executing a first query;
identifying a second query that also uses the first table used in executing the first query;
identifying a second table that is used in executing the second query but not in executing the first query; and
including, in the first disjoint table set, the first table and the second table; and
allocating a storage and/or management of the first disjoint table set including by storing the first disjoint table set at a different node in the distributed database than a second disjoint table set including a second plurality of tables that are not used in executing any of the plurality of queries.

11. The system of claim 10, further comprising:
selecting, based at least on a recentness and/or a frequency of use, the plurality of queries.

12. The system of claim 10, wherein the first table includes data required for executing the first query and the second query.

13. The system of claim 10, wherein the second table includes data required for executing the second query but not the first query.

14. The system of claim 10, further comprising:
determining at least one key performance index (KPI) associated with the first disjoint table set.

15. The system of claim 14, wherein the at least one KPI comprises a total, average, maximum, and/or minimum execution count corresponding to a number of times the first table and/or the second table are used in executing the first query and/or the second query.

16. The system of claim 14, wherein the at least one KPI comprises a total, average, maximum, and/or minimum execution time corresponding to a length of time required to execute the first query and/or the second query.

17. The system of claim 14, further comprising:
splitting the first disjoint table set into a first subset and a second subset in response to the at least one KPI exceeding a threshold value.

18. The system of claim 17, further comprising:
allocating the storage and/or management of the first disjoint table set such that the first subset is stored at and/or managed by a first node in the distributed database and the second subset is stored at and/or managed by a second node in the distributed database.

19. A non-transitory computer-readable storage medium including program code, which when executed by at least one data processor, causes operations comprising:
identifying, based at least on a plurality of queries executed at a distributed database, a first disjoint table set, the first disjoint table set including a first plurality of tables that are used either individually and/or in combination in executing the plurality of queries, and the identifying of the first disjoint table set comprising:
identifying a first table that is used in executing a first query;
identifying a second query that also uses the first table used in executing the first query;
identifying a second table that is used in executing the second query but not in executing the first query; and
including, in the first disjoint table set, the first table and the second table; and
allocating a storage and/or management of the first disjoint table set including by storing the first disjoint table set at a different node in the distributed database than a second disjoint table set including a second plurality of tables that are not used in executing any of the plurality of queries.

* * * * *